(12) United States Patent
Lecue et al.

(10) Patent No.: US 10,346,491 B2
(45) Date of Patent: Jul. 9, 2019

(54) GENERATING EXEMPLAR ELECTRONIC DOCUMENTS USING SEMANTIC CONTEXT

(71) Applicant: Accenture Global Solutions Limited, Dublin (IE)

(72) Inventors: Freddy Lecue, Dublin (IE); Caroline Brazil, Offaly (IE); Dadong Wan, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 344 days.

(21) Appl. No.: 15/170,030

(22) Filed: Jun. 1, 2016

(65) Prior Publication Data

US 2017/0351762 A1    Dec. 7, 2017

(51) Int. Cl.
| | | |
|---|---|---|
| *G06F 17/30* | (2006.01) | |
| *G06F 16/9535* | (2019.01) | |
| *G06F 16/248* | (2019.01) | |
| *G06F 16/2457* | (2019.01) | |
| *G06F 16/93* | (2019.01) | |
| *G06F 16/34* | (2019.01) | |

(52) U.S. Cl.
CPC ........ *G06F 16/9535* (2019.01); *G06F 16/248* (2019.01); *G06F 16/24575* (2019.01); *G06F 16/345* (2019.01); *G06F 16/93* (2019.01)

(58) Field of Classification Search
CPC ................ G06F 16/9535; G06F 16/93; G06F 16/24575; G06F 16/248; G06F 16/345
See application file for complete search history.

(56) References Cited

U.S. PATENT DOCUMENTS

| | | |
|---|---|---|
| 7,571,177 B2 | 8/2009 | Damle |
| 2007/0239697 A1 | 10/2007 | Chen et al. |
| 2008/0120257 A1 | 5/2008 | Goyal et al. |
| 2010/0305984 A1* | 12/2010 | Ben-Yitschak ........ G06Q 10/02 705/6 |
| 2012/0117455 A1 | 5/2012 | Fogel et al. |
| 2014/0351261 A1 | 11/2014 | Aswani et al. |

(Continued)

OTHER PUBLICATIONS

Australian Office Action in Australian Application No. 2017203355, dated Oct. 6, 2017, 5 pages.

*Primary Examiner* — Robert W Beausoliel, Jr.
*Assistant Examiner* — Hau Hoang
(74) *Attorney, Agent, or Firm* — Fish & Richardson P.C.

(57) ABSTRACT

Implementations are directed to providing an exemplar electronic document (EED) with actions including receiving input that is at least partially representative of a subject, receiving a plurality of stored subjects, each including data representative of a respective stored subject, and provided in a knowledge graph, processing the input based on semantic comparison between the input and each of the stored subjects to provide a set of semantic differences, each semantic difference representing the input and a respective stored subject, processing a profile in view of each of a plurality of other profiles to provide a set of semantic correlations, each semantic correlation representing the profile and a respective other profile, and providing the EED based on the sets of semantic differences and semantic correlations, the EED including at least a portion of the input, and respective portions of each of a plurality of stored subjects based on respective scores.

17 Claims, 9 Drawing Sheets

(56) References Cited

U.S. PATENT DOCUMENTS

2015/0206072 A1* 7/2015 Fabris .................... G06Q 10/02
                                                          705/5
2015/0254311 A1* 9/2015 Lerner .............. G06F 17/30554
                                                          707/722

* cited by examiner

GENERATING EXEMPLAR ELECTRONIC DOCUMENTS USING SEMANTIC CONTEXT

BACKGROUND

Enterprises may require individuals to plan and/or purchase goods and/or services. In one example, individuals may need to book travel. For example, travel arrangements are made on an individual basis, where individuals book flights, hotels, and other travel accommodations based on their own needs. As another example, a travel agent books travel arrangements for individuals. In such examples, an absence of contextual information can limit insight into appropriate travel accommodations for a particular individual and/or a particular trip. Further, it can be a relatively burdensome, manual effort to identify which hotel, which flight, which public transportation (if needed), and the like. In some instances, the travel arrangements are subsequently scrutinized for conformance to enterprise policies, and/or regulatory schema. Non-conforming travel arrangements can be resource-burdensome to audit.

SUMMARY

Implementations of the present disclosure are generally directed to generating exemplar electronic documents based contextual information. In some implementations, actions include receiving input from a user, the input including data that is at least partially representative of a subject, receiving a plurality of stored subjects, each stored subject including data that is at least partially representative of the respective stored subject, and that is provided in a knowledge graph, processing the input in view of each of the stored subjects based on semantic comparison between the input and each of the stored subjects to provide a set of semantic differences, each semantic difference representing the input and a respective stored subject, processing a user profile of the user in view of each of a plurality of other user profiles to provide a set of semantic correlations, each semantic correlation representing the user profile and a respective other user profile, and providing the exemplar electronic document based on the set of semantic differences and the set of semantic correlations, the exemplar electronic document including at least a portion of the input, and at least respective portions of each of a plurality of stored subjects based on respective scores. Other implementations of this aspect include corresponding systems, apparatus, and computer programs, configured to perform the actions of the methods, encoded on computer storage devices.

These and other implementations can each optionally include one or more of the following features: processing the input in view of each of the stored subjects includes semantically comparing features of the input to respective features of each of the stored subjects at least partially based on one or more hierarchical ontologies; semantically comparing includes, for each input and stored subject pair, determining a semantic distance as a weighted average of a number of edges in the knowledge graph between features of the input and features of the stored subject; processing a user profile of the user in view of each of a plurality of other user profiles includes semantically correlating attributes of the user profile to respective attributes of each of the plurality of other user profiles using graph subsumption; the respective scores are at least partially determined based on the set of semantic differences and the set of semantic correlations; the exemplar electronic document is a travel itinerary; actions further include: transmitting the exemplar electronic document to one or more computer-implemented booking services, and receiving a modified exemplar electronic document from the one or more computer-implemented services, the modified exemplar electronic document including booking data; the subject includes a trip and the data of the input includes trip details; data of the stored subjects represents travel possibilities for the trip; data of a stored subject describes a previous trip performed by another user; data of the stored subject describes respective previous trips of other users determined to be similar to the user; data of a stored subject relates to a travel policy of an entity; and providing the exemplar electronic document includes pre-populating trip details in the exemplar electronic document.

Implementations of the present disclosure provide one or more of the following advantages. In some examples, implementations enable semantic identification of preferred contexts, for example, travel trips of user trip, or travel profile for user profile. In some examples, implementations enable semantic aggregation of preferred context and content, for example, aggregation of travel trips or profiles. In some examples, implementations enable semantic reasoning for context combination, for example, consistency checking of any combination of travel trips or profiles. Accordingly, implementations of the present disclosure provide optimized identification of exemplars based on semantic context, and enable the efficient production of a relevant, accurate exemplar electronic document. In this manner, computer resources (e.g., processors, memory, bandwidth) are conserved.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to automatically generating exemplar electronic documents based on semantic context. More particularly, implementations of the present disclosure are directed to automatically generating exemplar electronic documents based on a knowledge graph (e.g., a data structure relating entities through semantic properties), semantic identification of subjects, semantic correlation of users, and content and context aggregation. In some implementations, an exemplar electronic document is provided as an electronic document that is representative of a subject, and that includes one or more features of the subject. Example subjects can include an event, a set of events, an item, a product, a service, and the like. In some implementations, one or more actions are automatically executed based on the exemplar electronic document.

Implementations of the present disclosure will be described in further detail herein with reference to an example context. The example context includes enterprise travel planning and booking (e.g., for an employee of the enterprise). In the example context, the exemplar electronic document is provided as a travel itinerary for a trip that a particular employee is to take; the trip is provided as the subject, and example features of the subject include dates, reason for travel, to location(s), from location(s), conveyance(s) (e.g., planes, trains, automobiles, ferries), hotels, events, dinners, lunches, and the like. It is contemplated, however, the implementations of the present disclosure can be realized in any appropriate context.

Figure 1:
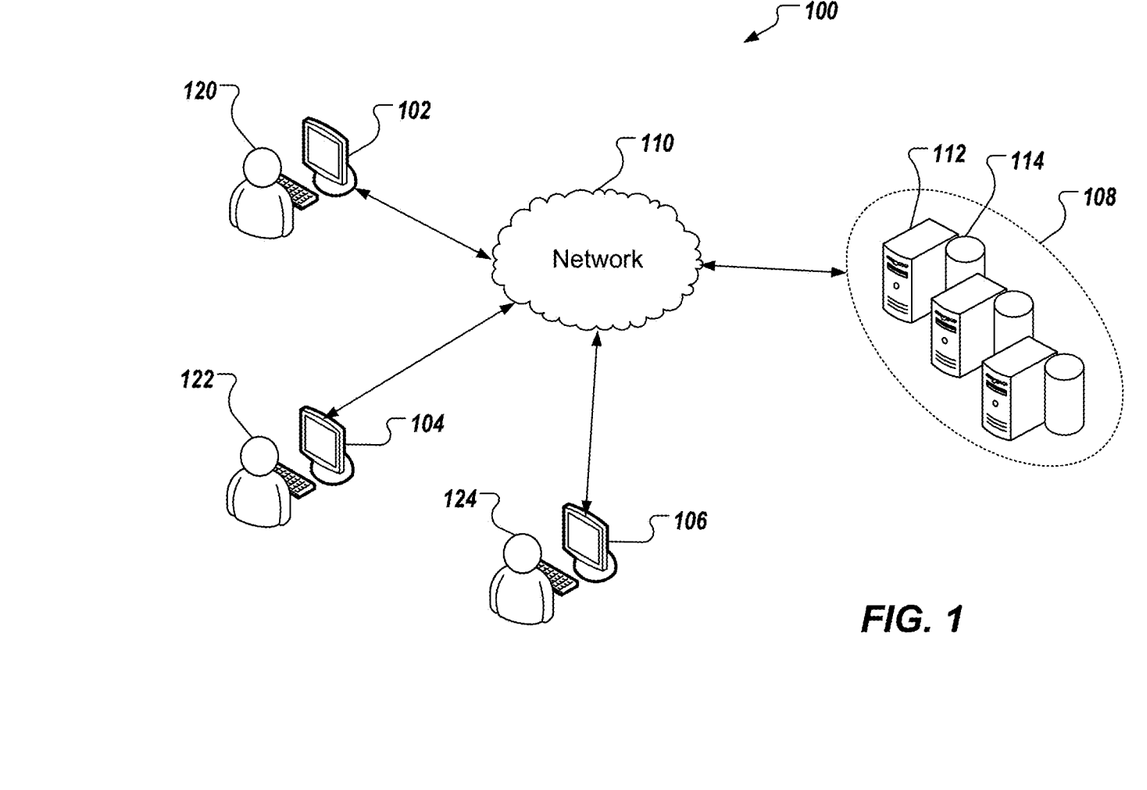
FIG. 1 depicts an example system that can execute implementations of the present disclosure.

FIG. 1 depicts an example system 100 that can execute implementations of the present disclosure. The example system 100 includes computing devices 102, 104, 106, a back-end system 108, and a network 110. In some examples, the network 110 includes a local area network (LAN), wide area network (WAN), the Internet, or a combination thereof, and connects web sites, devices (e.g., the computing device 102, 104, 106), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a computer-implemented service for generating exemplar electronic documents in accordance with implementations of the present disclosure.

In some examples, the computing devices 102, 104, 106 can each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the computing devices 102, 104, 106 are each provided as a desktop computer that is used by respective users 120, 122, 124. In the example context, the users 120, 122, 124 are employees of an enterprise. For example, the user 120 can include an employee "Jamie," who is planning travel for work, the user 122 can include an employee "Paul," who had previously traveled for work, and the user 124 can include an employee "Tom," who had also previously traveled for work. In some examples, each user 120, 122, 124 is associated with a user profile maintained by the enterprise. In some examples, the user profile includes one or more attributes (e.g., name, group, role, contact information, etc.). In some implementations, the enterprise maintains a knowledge base of information associated with each user. For example, the enterprise maintains a knowledge base of information associated with travel (e.g., duration, location, type, hotels, travel conveyances) each of the users has undertaken as part of their employment.

In accordance with implementations of the present disclosure, and as introduced above, exemplar electronic documents are automatically generated based on a knowledge graph, semantic identification of subjects, semantic correlation of users, and content and context aggregation. In some implementations, the knowledge graph is provided based on data associated with one or more subjects. In some examples, the data is provided as historical data that reflects one or more subjects that are associated with the enterprise. In the example context, the knowledge graph is provided based on data associated with travel that has been performed by users (e.g., users 120, 122, 124) of the enterprise.

In some examples, a knowledge graph is a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a person Alpha, a node B represents a person Beta, and an edge E is associated with the relationship "is the father of," then having the edge E connect the nodes in the direction from node A to node B in the graph represents the fact that Alpha is the father of Beta. In some examples, the knowledge graph can be enlarged with schema-related knowledge (e.g., Alpha is a concept Person, Beta is a concept Person, and "is the father of" is a property or relationship between two entities/instances of concept Person). Adding schema-related information supports evaluation of reasoning results, such as subsumption or graph pattern matching.

A knowledge graph can be represented by any of a variety of physical data structures. For example, a knowledge graph can be represented by triples that each represent two entities in order, and a relationship from the first to the second entity; for example, [alpha, beta, is the father of], or [alpha, is the father of, beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers.

The entities represented by a knowledge graph need not be tangible things or specific people. The entities can include particular people, places, things, artistic works, concepts, events, or other types of entities. Thus, a knowledge graph can include data defining relationships between people (e.g., co-stars in a movie); data defining relationships between people and things (e.g., a particular singer recorded a particular song); data defining relationships between places and things (e.g., a particular type of wine comes from a particular geographic location); data defining relationships between people and places (e.g., a particular person was born in a particular city); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing a person could have a schema defining fields for information such as birth date, birth place, and so on. Such information can be represented by fields in a type-specific data structure, or by triples that look like node-relationship-node triples (e.g., [person identifier, was born on, date]), or in any other convenient predefined way. In some examples, some or all of the information specified by a type schema can be represented by links to nodes in the knowledge graph; for example, [one person identifier, child of, another person identifier], where the other person identifier is a node in the graph.

In accordance with the example context, and as described in further detail herein, a knowledge graph can be provided as a collection of data and a schema representing subjects and relationships between subjects, and/or features of subjects. For example, a knowledge graph, or at least a portion thereof, can be provided as a collection of data representing a trip and features of a trip.

Figure 2:
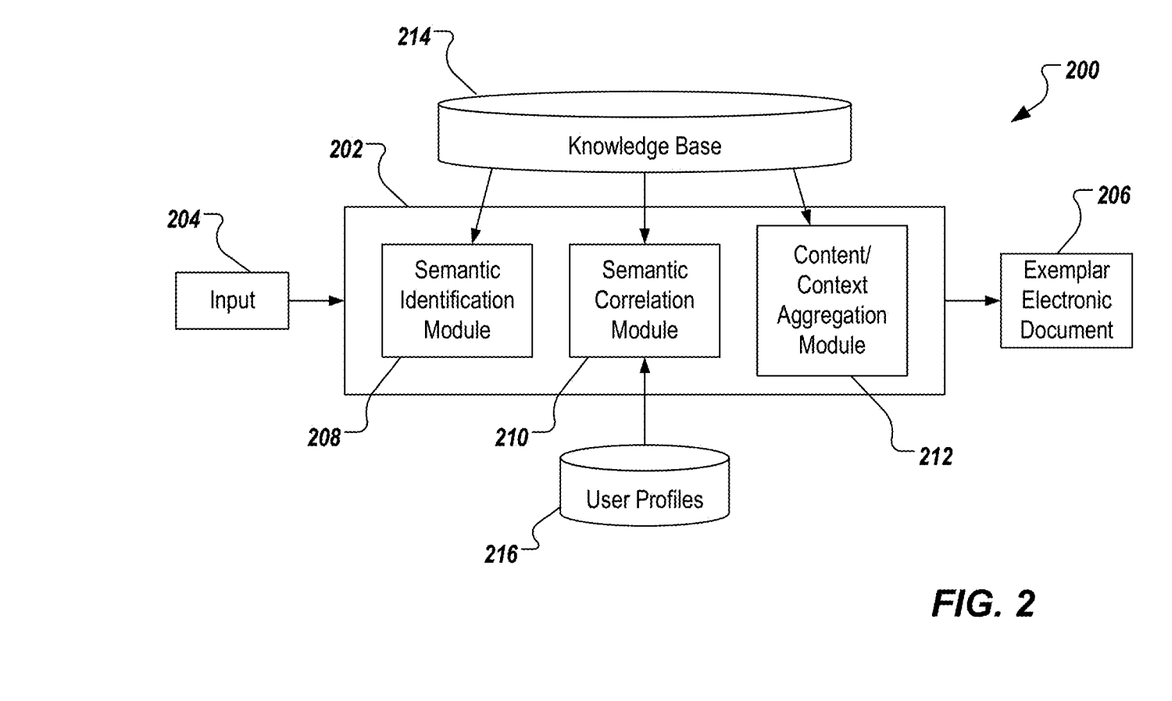
FIG. 2 depicts an example module architecture in accordance with implementations of the present disclosure.

FIG. 2 depicts an example module architecture 200 in accordance with implementations of the present disclosure. The example module architecture 200 includes an exemplar electronic document generation module 202 that receives input data 204, and provides an exemplar electronic document 206. In the depicted example, the exemplar generation module 202 includes a semantic identification module 208, a semantic correlation module 210, and a content and context aggregation 212. The example module architecture 200 also includes a knowledge base 214, and a user profile database 216. In some examples, each of the modules is provided as one or more computer-executable programs executed by one or more computing devices (e.g., of the back-end system 108 of FIG. 1).

In some implementations, the knowledge base 214 stores historical data associated with one or more subjects. In the examples context, the knowledge base 214 stores data indicative of user profiles (e.g., unique user identifiers associated with respective user profiles), trips, and features of trips. In some examples, the data is stored as a knowledge graph, described in further detail herein. In some examples, data in the knowledge base 214 is organized based on an ontology for semantic querying, ordering, and ranking, described in further detail herein. For example, and in the example context, justifications for trips can be ordered in a hierarchy (e.g., an Acquisition Visit is a Client Visit, and a Client Visit is an Event). In some examples, the user profile database 216 stores user profiles of respective users of the enterprise. For example, each user profile is associated with a unique identifier that identifies a respective user (e.g., an employee ID assigned to, and unique to the user). In some examples, each user profile stored in the user profile database 216 includes one or more attributes (e.g., name, group, role, contact information, etc.) of the respective user.

In some examples, the input 204 includes data defining a subject and one or more features of a subject. In the example context, the input 204 includes data defining a trip to be taken by a user, and features of the trip. For example, the user Jamie (e.g., the user 120 of FIG. 1) is planning a trip and provides the following example input defining the trip:
Location: Austin, Tex., USA
Duration: 2 days
Date: 2016 Feb. 16
Justification: Acquisition Visit
Weekend
External Event: Live Music In some examples, the input is associated with the unique identifier that identifies the user providing the input (e.g., an employee ID assigned to, and unique to Jamie).

In accordance with implementations of the present disclosure, existing, already conducted travel trips are semantically identified based on the input 204. For example, all trips stored in the knowledge base 214 are compared to the input 204 to identify semantic equivalents of the trip represented by the input 204. In some examples, the semantic identification is based on determining one or more concept distances based on data stored in the knowledge graph.

Figure 3:
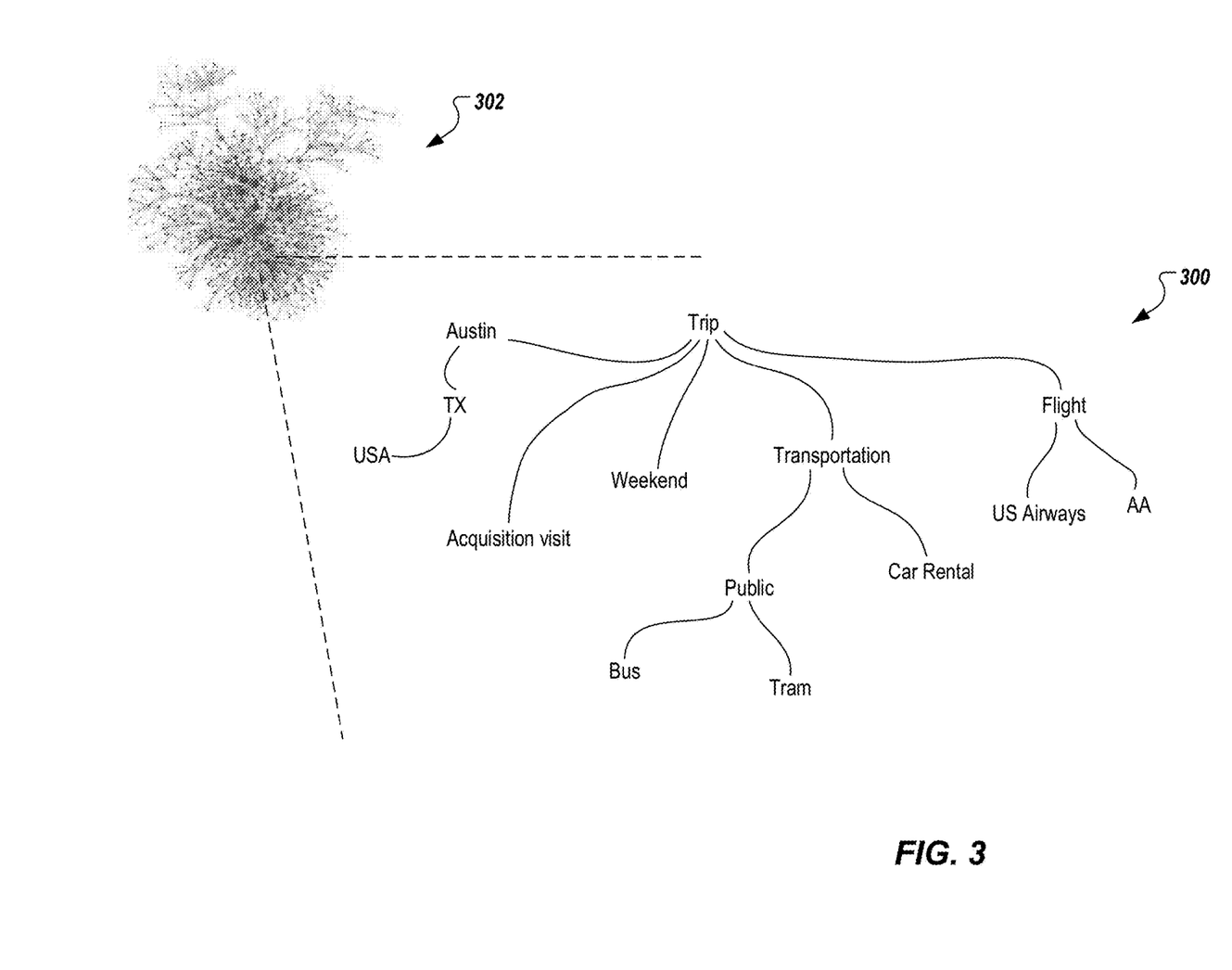
FIG. 3 depicts an example portion of an example knowledge graph.

FIG. 3 depicts an example portion 300 of an example knowledge graph 302 in accordance with the example context. In the depicted example, a node Trip is related to a plurality of other nodes (e.g., Austin, Acquisition Visit, Weekend, Transportation, Flight), by respective edges. In some examples, each edge represents a relationship between nodes. For example, the edge between Trip and Austin represents a relationship of [travel to], and the edge between Trip and Acquisition Visit represents a relationship of [justification for].

Figure 4:
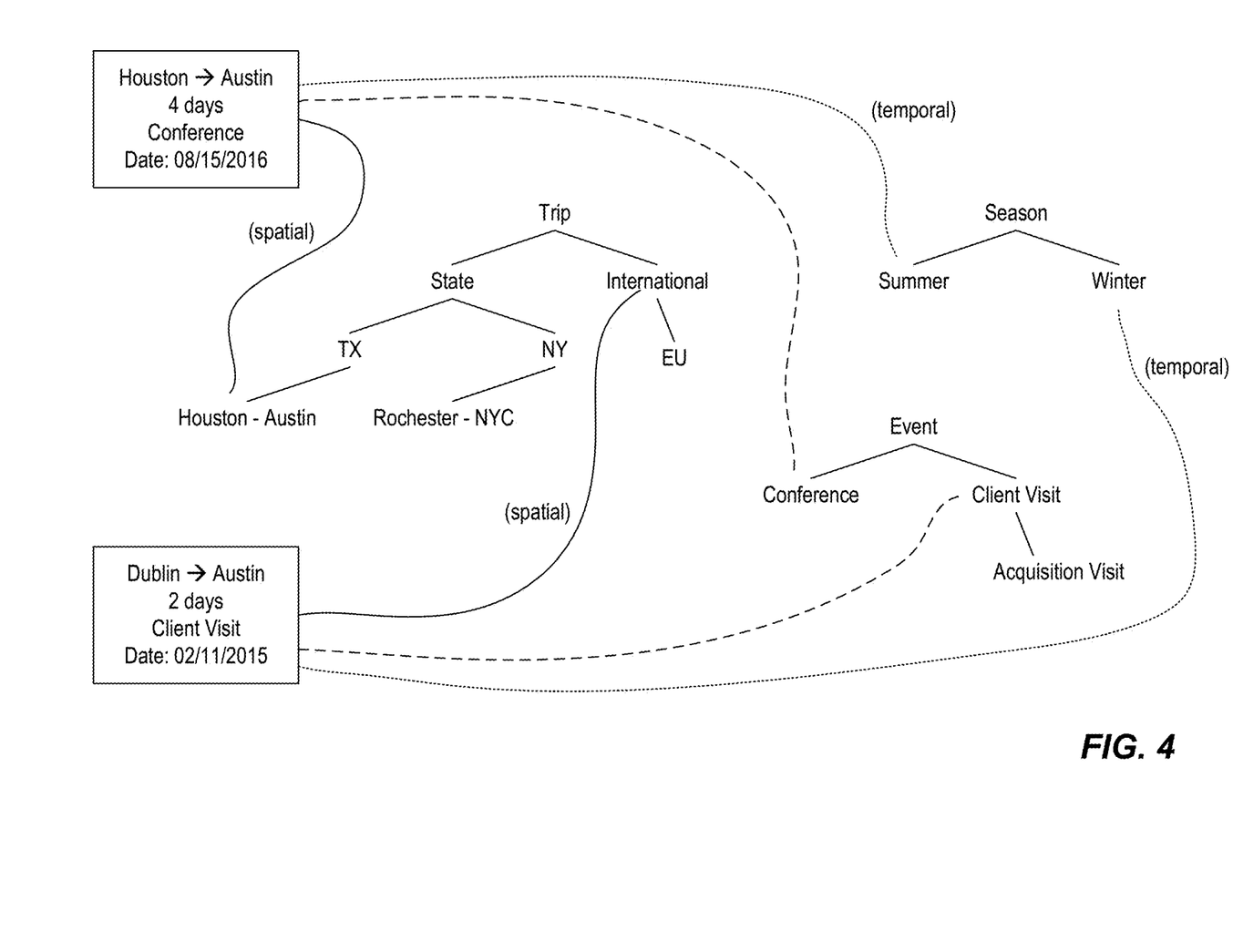
FIG. 4 depicts a graphical representation of example semantic identification of subjects in accordance with implementations of the present disclosure.

To assist in illustrating implementations of the present disclosure, the knowledge base 214 stores data associated with trips performed by other users, such as Paul and Tom (e.g., the users 122, 124, respectively, of FIG. 1). For example, the knowledge base 214 stores data for the following example trips (among, potentially, tens, hundreds, thousands of other trips):
Location: Dublin, IE→Austin, Tex., USA
Duration: 4 days
Date: 2015 Aug. 15
Justification: Conference
Week
Public Transportation
USA Airways (Dublin→Chicago→Austin)
External Event: none
and
Location: Dublin, IE→Boston, Mass., USA
Duration: 12 days
Date: 2015 Feb. 11
Justification: Client Visit
Weekend
Car Rental
USA Airways
External Event: Computer Science Conference
Restaurant: Trio Chain FIG. 4 depicts a graphical representation of example semantic identification of subjects in accordance with implementations of the present disclosure. In the depicted example, a hierarchical ontology is provided in view of the example context. For example, a hierarchical (or taxonomy-based) ontology for Trip is provided, where State and International are both types of trip, TX and NY are both types of trips under State, etc. As another example, a hierarchical ontology for Season is provided, where Summer and Winter are types of season. As another example, a hierarchical ontology for Event is provided, where Conference and Client Visit are both types of event, and Acquisition Visit is a Client Visit.

In some implementations, semantic identification is provided by comparing features of the input subject (e.g., the input 204) to features of previously conducted subjects. Continuing with the examples above, the input provided by Jamie is semantically compared to subjects stored in the knowledge base 214. In some examples, a semantic delta ($\Delta_{SEM}$) is determined between the input subject and each stored subject. In the example context, the input trip (i.e., Jamie's to-be-planned trip to Austin) is semantically compared to all stored trips (i.e., Houston→Austin, Dublin→Boston, among many others). In some examples, spatial correlations and/or temporal correlations are provided between features of subjects. For example, a spatial correlation can be provided based on location, and a temporal correlation can be provide based on date.

In some implementations, $\Delta_{SEM}$ is determined as a semantic distance between the input subject (e.g., planned trip) and a stored subject (e.g., stored trip). In some examples, the semantic distance is determined as a weighted average of the number of edges in the knowledge graph (or relevant portion of a knowledge graph) between all features of the respective input subject and stored subject. For example, the more edges between two features, the more distant the features are from one another, and the less semantically similar the features are. On the other hand, the fewer edges between two features, the less distant the features are from one another, and the more semantically similar the features are.

In some implementations, $\Delta_{SEM}$ is determined based on the following example relationship:

$$\Delta_{SEM_{I \to j}}(S_I, S_j) = \frac{\sum_{i=1}^{n} \alpha_i \left( \frac{1}{1 + d(S_I^i, S_j^i)} \right)}{\sum_i \alpha_i}$$

where:
  $S_I$=the input subject (e.g., the trip being planned)
  i=particular trip feature;
  n=number of trip features
  $S_j^i$=feature of subject j;
  $S_j$=vector of feature of subject j (e.g., stored trip being compared to $S_I$);
  $\alpha$=weighted factor with value in [0,1]; and
  d=semantic similarity of features e.g., the number of edges between the features.

Continuing with the examples above, and as depicted in the example of FIG. 4, $\Delta_{SEM}$ for Jamie's planned trip to Austin, and the stored trip Houston→Austin can be calculated as 0.9 (e.g., both trips are to Austin for an Event, where Conference and Client Visit are both Events). As another example, $\Delta_{SEM}$ for Jamie's planned trip to Austin, and the stored trip Dublin→Boston can be calculated as 0.7 (e.g., both trips are in Winter for an Event). A set of $\Delta_{SEM}$'S is provided and includes one or more $\Delta_{SEM}$'s, each $\Delta_{SEM}$ corresponding to a respective semantic comparison between the input subject and a stored subject. For example, if the input subject is compared to 50 stored trips, the set of $\Delta_{SEM}$'s includes 50 $\Delta_{SEM}$ values.

In some implementations, a set of user profiles is provided based on the semantic comparisons. In some examples, each stored subject is associated with a respective user profile (e.g., the user profile of the user that took the trip). In some examples, the set of user profiles includes unique user profiles. For example, if a user is associated with multiple subjects included in the semantic comparison, the user profile of the user is only included once in the set of user profiles (e.g., Tom took 10 trips of the 50 stored trips semantic comparison was provided for, but Tom's profile is only included once in the set of user profiles).

Continuing with the examples above, Paul can be associated with the trip Houston→Austin, and Tom can be associated with the trip Dublin→Boston. Consequently, a set of user profiles is provided and includes Paul's user profile and Tom's user profiles (among, potentially, many others).

Figure 5:
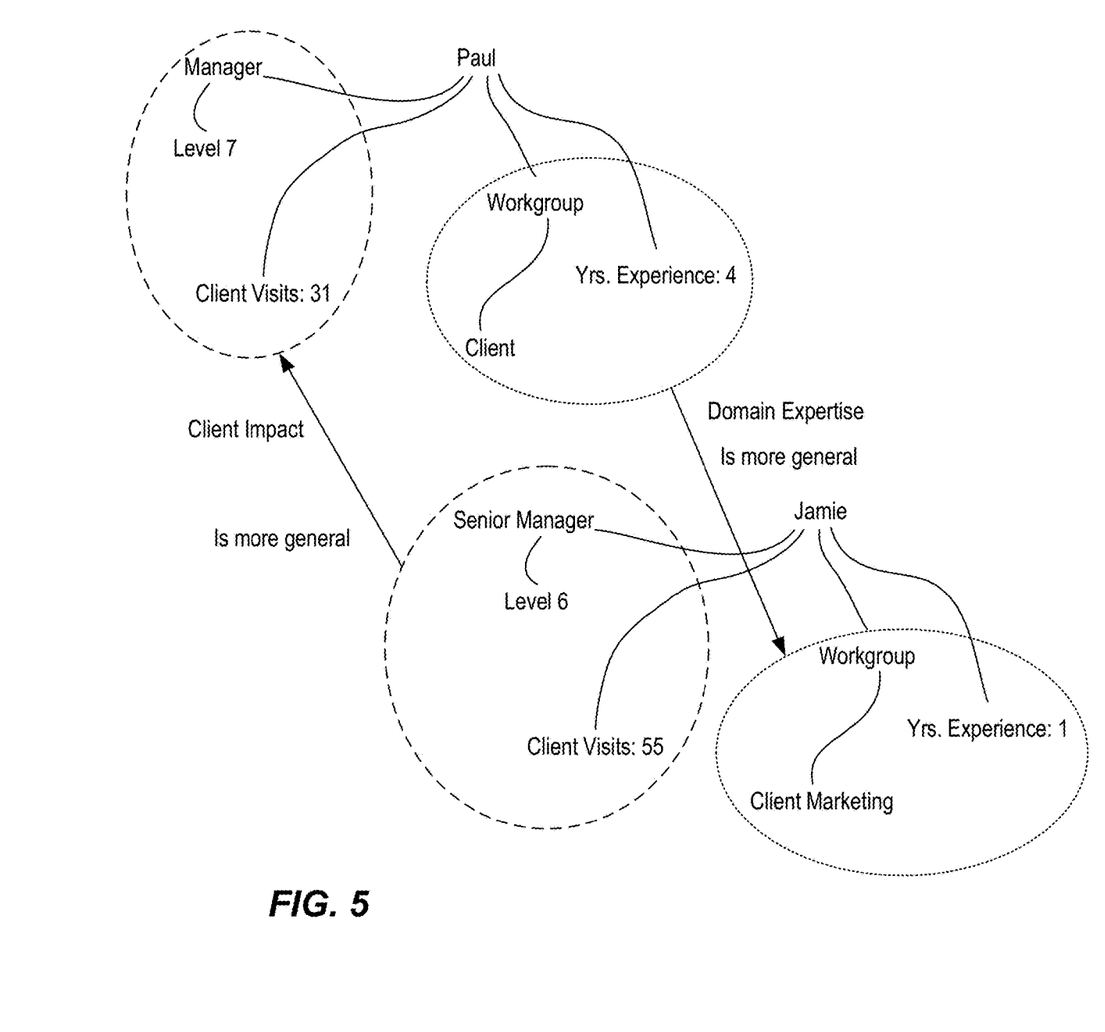
FIG. 5 depicts a graphical representation of example semantic correlation of users in accordance with implementations of the present disclosure.

FIG. 5 depicts a graphical representation of example semantic correlation of users in accordance with implementations of the present disclosure. In some implementations, the semantic correlation of users is provided based on user profiles (e.g., stored in the user profile database 216). For example, the user profile of the user that submitted the input 204 (e.g., Jamie) can be retrieved from the user profile database 216 based on the unique identifier (e.g., employee ID), and can be compared to one or more other user profiles stored in the user profile database 216 (among, potentially, tens, hundreds, thousands of other user profiles). More particularly, the user profile can be compared to user profiles in the set of user profiles that is provide based on the semantic comparison of subjects, as described above.

In some implementations, the semantic correlation is provided based on graph subsumption, or sub-graph pattern matching of the user profiles. For example, the semantic correlation between a first user profile (e.g., the user profile of the user that submitted the input 204) and a second user profile stored in the user profile database 216 is evaluated based on the maximum number of features that characterizes the first profile with respect to the second profile through graph subsumption (specification relation). In some examples, graph subsumption is provided as an instance of graph isomorphism, in which isomorphism exists when two graphs are equivalent. For example, two graphs having edges and vertices, and which contain the same number of vertices connected in the same way are said to be isomorphic. Subsumption aims at identifying specification-based relationships of entities. For example, TX is subsumed by State in FIG. 4, because TX is more specific than State. Note that subsumption is not a symmetric function. For instance State is not subsumed by TX.

In some implementations, the semantic correlation ($C_{SEM}$) is determined based on the following example relationship:

$$C_{SEM_{i \to j}}(P_i, P_j) = \frac{1}{m} \cdot \left\{ \sum_{k=1}^{m} \text{Subsume}(P_i^k, P_j^k) \right\}$$

where:
- $P_i$=the input profile (e.g., the user profile of the user that provided the input). $P_i^k$ is the feature k of user profile $P_i$.
- $P_j$=a potential profile that is evaluated against $P_i$ (e.g., the user profile of an other user). $P_j^k$ is the feature j of user profile $P_j$.
- i=1, ..., n;
- j=1, ..., n;
- n=number of other user profiles in the set of user profiles;
- m=number of attributes in profile; and
- Subsume→Return 1 if $P_i^k$ is more specific than $P_j^k$, otherwise return 0.

Continuing with the examples above, and as depicted in the example of FIG. 5, $C_{SEM}$ between Jamie and Paul, and between Jamie and Tom can be determined. In the example of FIG. 5, a comparison between Jamie's user profile and Paul's user profile is graphically depicted. In some examples, attributes of the user profiles are grouped into one or more groups. Example groups include Domain Expertise and Client Impact. In some examples, Domain Expertise includes the example attributes Workgroup and Years of Experience, and Client Impact includes Title and Number of Client Visits. In the Example of FIG. 5, and with respect to Domain Expertise, Jamie is in the Client Marketing Workgroup and has 1 Years of Experience, while Paul is in the Client Workgroup and has 4 Years of Experience. In the Example of FIG. 5, and with respect to Client Impact, Jamie has the title of Senior Manager at a Level 6 and has 55 Client Visits, while Paul has a title of Manager at Level 7 and has 31 Client Visits. In some examples, $C_{SEM}$ between Jamie and Paul can be provided as 0.5, and $C_{SEM}$ between Jamie and Tom can be provided as 0.4. For example, Jamie can be determined to be closer to Paul based on Domain Expertise, and closer to Tom based on Client Impact.

A set of $C_{SEM}$'s is provided and includes one or more $C_{SEM}$'s, each $C_{SEM}$ corresponding to a respective semantic correlation between the user profile of the user that provided the input and the user profile of another user. For example, if the user profile is compared to 30 other user profiles, the set of $C_{SEM}$'s includes 30 $C_{SEM}$ values. The $C_{SEM}$ values with the highest score are considered.

In accordance with implementations of the present disclosure, content and context aggregation is performed based on the semantic comparisons and the semantic correlations. More particularly, a score (Sim) is provided based on combining the semantic correlation of user profiles with the semantic comparison of subjects (e.g., trips). In some examples, the score is weighted based on one or more features of the subjects. In some examples, the score is determined based on the following example relationship:

$$Sim(P_i, P_j, S_k, S_l) = \text{Max}\left\{value | value = \frac{1}{\alpha+\beta}(\alpha C_{SEM_{i \to j}}(P_i, P_j) + \beta \Delta_{SEM_{k \to l}}(S_k, S_l))\right\}$$

where:
- User of $P_i$ is the same as user of $S_k$
- User of $P_j$ is the same as user of $S_l$
- $P_i$=the input profile (e.g., the user profile of the user that provided the input)
- $P_j$=a potential profile that is evaluated against $P_i$ (e.g., the user profile of an other user).
- $S_k$=the input subject (e.g., the trip being planned)
- $S_l$=vector of feature of subject j (e.g., stored trip being compared to $S_l$);
- i=1, ..., n;
- k=1, ..., n;
- j=1, ..., m;
- l=1, ..., m;
- value=the maximum value to be returned
- α=weighted factor with value in [0,1] such that α+β=1;
- β=weighted factor with value in [0,1]α+β=1;
- n=number of other user profiles in the set of user profiles;
- m=number of trip features;
- t=the maximum number of features considered; and
- Subsume→Return 1 if $P_l$ is more general than $P_k$, otherwise return 0.

Continuing with the examples above, a score as between Jamie's planned trip to Austin, and Paul's stored trip to Austin can be provided as 0.84, and a score as between Jamie's planned trip to Austin, and Tom's stored trip to Boston can be provided as 0.62. Accordingly, a data set can be provided as (Jamie, {(Paul's trip, 0.84), (Tom's trip, 0.62)}.

In some implementations, the stored subjects are ranked based on the scores (e.g., highest to lowest), and the exemplar electronic document is provided based on values of the stored subjects in view of the scores. In some examples, an exemplar electronic document can be provided as a template that includes a plurality of features in respective fields, values of the features to be provided based on the input, and one or more of the stored subjects. For example, and in the example context, a template electronic document can include fields for Location, Duration, Date, Justification, Flights, Transportation, Restaurant, External Event, and the like. In some examples, one or more fields are populated based on the input (e.g., the input provided by Jamie to trigger trip planning). For example, Location: Austin, Tex., USA, Duration: 2 days, Date: 2016 Feb. 16, Justification: Acquisition Visit. In some examples, one or more fields are populated based on features provided from the stored subjects. For example, Transportation: Public Transportation (from Paul's trip to Austin), Restaurant: Trio Chain (from Tom's trip to Boston), Airline: USA Airways (from Paul's and Tom's respective trips), and Flights: Dublin→Chicago→Austin (from Paul's trip to Austin).

In some implementations, the exemplar electronic document is populated based on a ranked list of semantically similar stored subjects (e.g., shortlisted travel trips). In some examples, the stored subjects are ranked based on the Sim score, described above, the higher the score, the higher the ranking. Selection of values of particular fields to populate the exemplar electronic document is based on retrieving values of fields of stored subjects starting with the highest ranked stored subject. In some examples, the system iteratively goes through all fields required (e.g., Transportation, Airlines, etc.). If available from a currently considered, stored subject, the system select values to populate the fields (e.g., Public transportation, USA Airways). If not available from the currently considered, stored subject, the system goes through the next best match (e.g., the next stored subject in the ranked list of stored subjects) to populate fields missing from higher ranked stored subjects (e.g., Restaurant Trio Chain).

In some implementations, the exemplar electronic document is populated as described above, and is displayed to the user. For example, the exemplar electronic document can be displayed to the user on a computing device. In some examples, the user can edit one or more features of the subject captured in the electronic document. For example, the user can add, delete, or edit (modify) one or more features.

In some implementations, the exemplar electronic document can be provided to one or more services for booking the subject. For example, the exemplar electronic document can be provided to a hotel booking service, a flight booking service, a car rental booking service, a restaurant booking service, and the like. In some examples, a single service can attend to one or more of hotel, flight, car rental, restaurant booking. In some examples, booking services are provided as one or more computer-implemented services. For example, a computer-implemented booking service can receive the exemplar electronic document, and can provide booking information based on the values provided in the exemplar electronic document. For example, and in the example context, a flight booking service can receive the exemplar electronic document, which indicates USA Airways is to be flown from Dublin→Chicago→Austin on 2016 Feb. 16, returning on 2016 Feb. 18, and can process this information to identify flights. In some examples, the flight booking service can automatically book the flights on behalf of the traveler (e.g., Jamie) using stored information (e.g., in the user profile). In some examples, the flight booking service can provide potential flights to the user, which the user can select from, and the flights selected by the user are booked. This can occur for hotels, car rentals, and the like (e.g., automatically booked, or booked based on suggestions provided to the user and the user selecting from the suggestions). In some implementations, whether automatically booked and/or booked based on user selections, an exemplar electronic document is provided with booking information.

Figure 6:
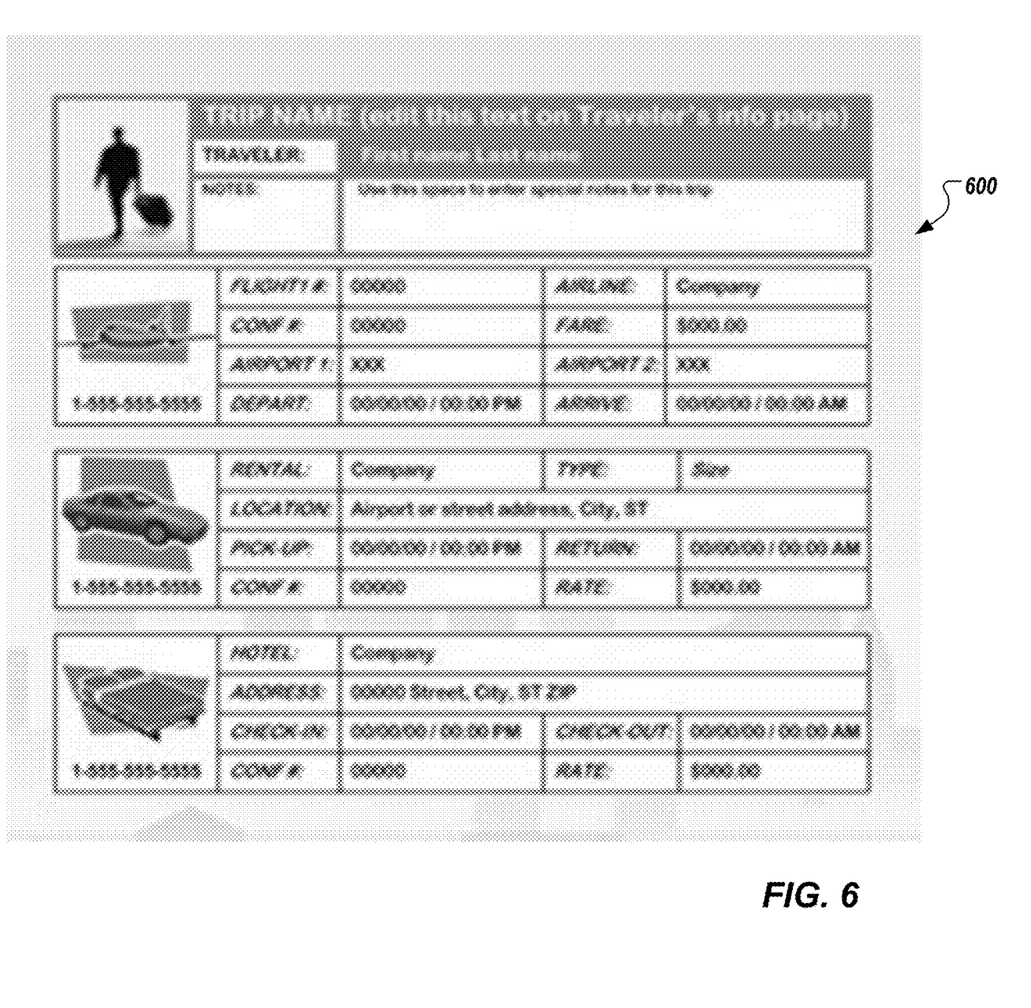
FIG. 6 depicts an example exemplar in accordance with implementations of the present disclosure.

FIG. 6 depicts an example exemplar electronic document 600 in accordance with implementations of the present disclosure. In accordance with the example context, the example exemplar electronic document 600 includes a travel itinerary with booking details for flights, car rental, hotel, and the like.

Figure 7:
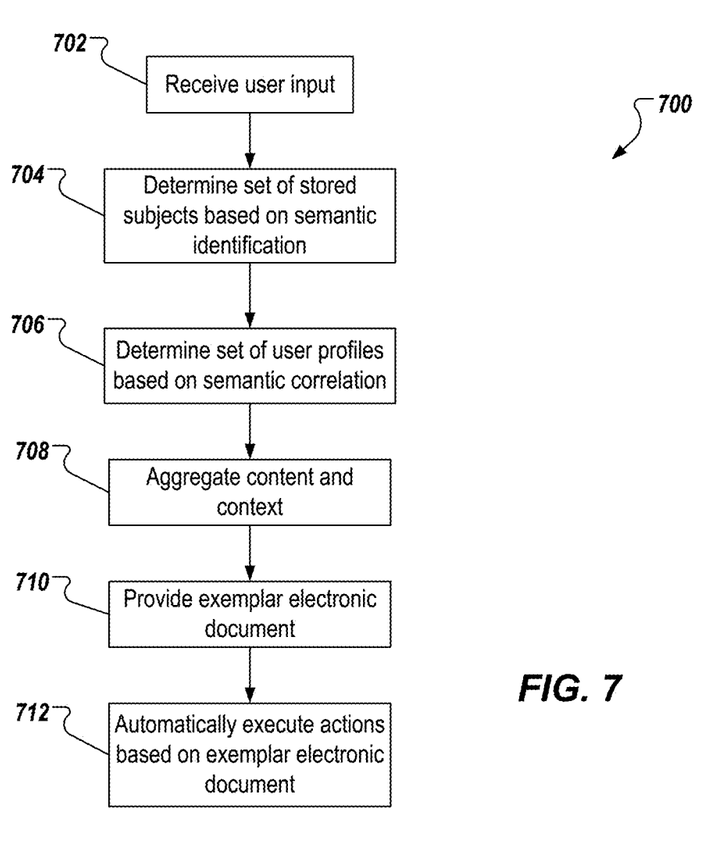
FIGS. 7-9 depict example processes that can be executed in implementations of the present disclosure.

FIG. 7 depicts an example process 700 that can be executed in implementations of the present disclosure. In some examples, the example process 700 is provided using one or more computer-executable programs executed by one or more computing devices (e.g., the back-end system 108 of FIG. 1). The example process 700 can be executed to provide an exemplar, as described herein.

User input is received (702). For example, a user provides input 204 to the exemplar electronic document generation module 202 of FIG. 2. In some examples, the user input provides data indicative of a subject. A set of stored subjects is determined based on semantic identification (704). For example, the input subject is semantically compared to a plurality of stored subjects (e.g., stored in the knowledge base 214 of FIG. 2 as at least a portion of a knowledge graph). In some examples, the set of stored subjects is provided as, or includes a set of $\Delta_{SEM}$'s, as described herein. A set of user profiles is determined based on semantic correlation (706). For example, a user profile of the user that submitted the input is semantically correlated to a plurality of other user profiles. In some examples, the other user profiles are provided in a set of user profiles that is determined based on the stored subjects considered during the semantic identifications. In some examples, the set of user profiles provided based on semantic correlation is provided as, or includes a set of $C_{SEM}$'s, as described herein.

Content and context are aggregated (708). In some examples, and as described herein, content and context are aggregated based on the set of $\Delta_{SEM}$'s and the set of $C_{SEM}$'s to provide respective scores associated with subject and user tuples, as described herein. For example, (Jamie, {(Paul's trip, 0.84), (Tom's trip, 0.62)}). An exemplar electronic document is provided (710). For example, features provided from the input and one or more stored subjects are used to populate fields of the exemplar electronic document, as described herein. One or more actions are automatically performed based on the exemplar electronic document (712). For example, the exemplar electronic document is automatically forwarded to one or more computer-implemented booking services. In some examples, the one or more computer-implemented booking services automatically book respective features (e.g., hotel, flight, restaurant), and/or automatically provides suggestions to the user, and books a suggestion selected by the user.

Figure 8:
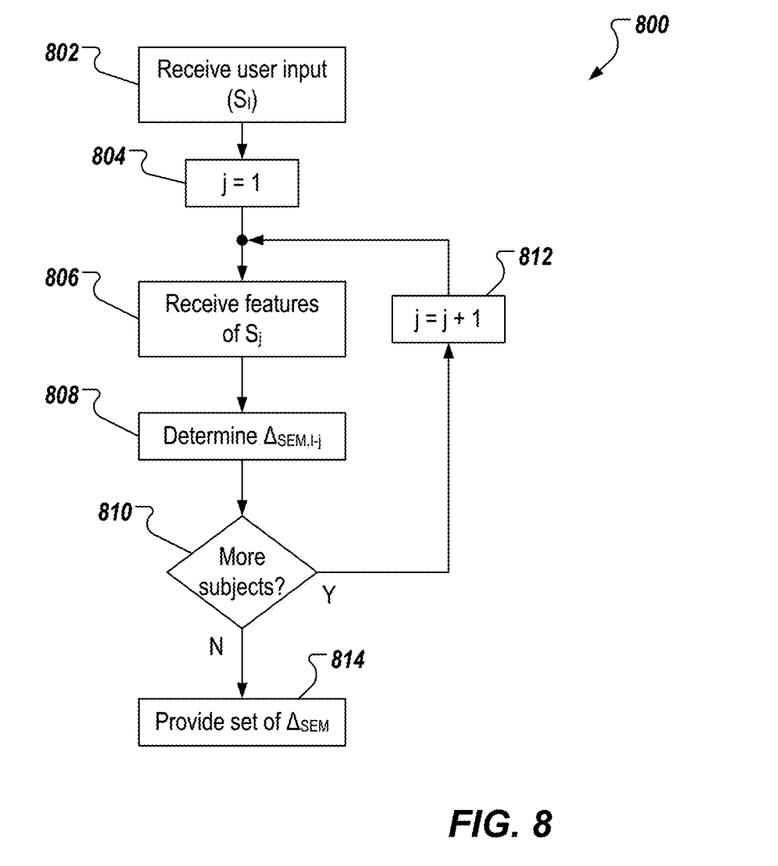

FIG. 8 depicts an example process 800 that can be executed in implementations of the present disclosure. In some examples, the example process 800 is provided using one or more computer-executable programs executed by one or more computing devices (e.g., the back-end system 108 of FIG. 1; the semantic identification module 208 of FIG. 2). The example process 800 is executed to provide a set of stored subjects based on semantic identification.

User input is received (802). For example, a user provides input 204 to the exemplar electronic document generation module 202 of FIG. 2. In some examples, the user input provides data indicative of a subject. A counter j is set equal to 1 (804). Features of a stored subject $S_j$ are received (806). For example, features of $S_j$ are received by the semantic identification module 208 from the knowledge base 214. $\Delta_{SEM,I \to j}$ is determined (808). For example, the semantic identification module 208 semantically compares features of the input subject ($S_I$) to the stored subject ($S_j$) to provide $\Delta_{SEM,I \to j}$, as described herein. It is determined whether there are more stored subjects (810). For example, it is determined whether all relevant stored subjects stored in the knowledge base 214 have been evaluated. If not, the counter j is incremented (812), and the example process loops back. If so, a set of $\Delta_{SEM}$'s is provided (814).

Figure 9:
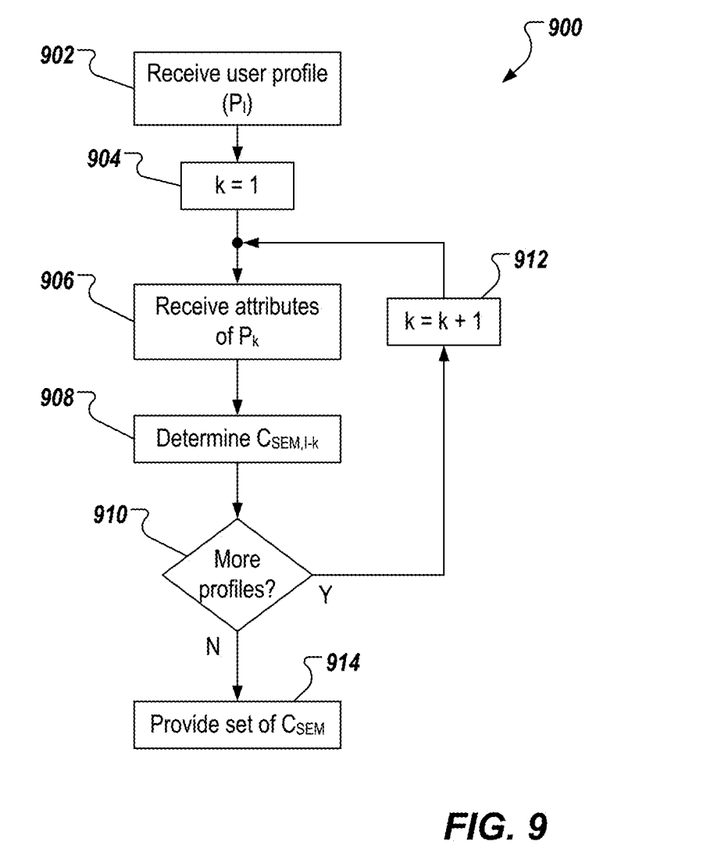

FIG. 9 depicts an example process 900 that can be executed in implementations of the present disclosure. In some examples, the example process 900 is provided using one or more computer-executable programs executed by one or more computing devices (e.g., the back-end system 108 of FIG. 1; the semantic correlation module 210 of FIG. 2). The example process 900 is executed to provide a set of user profiles based on semantic correlation.

A user profile ($P_I$) is received (902). For example, the semantic correlation module 210 receives the user profile from the user profile database 216 based on a user identifier associated with the user that provided the input 204. A counter k is set equal to 1 (904). Attributes of a user profiled ($P_k$) are received (906). For example, the user profile ($P_k$) and its associated attributes are received from the user profile database 216. A semantic correlation $C_{SEM,I \to k}$ is determined (908). For example, the semantic correlation module 210 semantically correlates attributes of the input user profile ($P_I$) to another user profile ($P_k$) to provide $C_{SEM,I \to k}$, as described herein. It is determined whether there are more user profiles for semantic correlation (910). For example, it is determined whether all relevant user profiles stored in the user profile database 216 have been evaluated. If not, the counter k is incremented (912), and the example process loops back. If so, a set of $C_{SEM}$'s is provided (914).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing an exemplar electronic document, the method being executed by one or more processors and comprising:
   receiving, by the one or more processors, input from a user, the input comprising data that is at least partially representative of a subject;
   receiving, by the one or more processors, a plurality of stored subjects, each stored subject comprising data that is at least partially representative of the respective stored subject, and that is provided in a knowledge graph;
   processing, by the one or more processors, the input in view of each of the stored subjects based on semantic comparison between the input and each of the stored subjects to provide a set of semantic comparisons of subjects, each semantic comparison of subjects representing the input and a respective stored subject;
   processing, by the one or more processors, a user profile of the user in view of each of a plurality of other user profiles to provide a set of semantic correlations of user profiles, each semantic correlation of user profiles representing the user profile and a respective other user profile; and
   providing, by the one or more processors, the exemplar electronic document based on the set of semantic comparisons of subjects and the set of semantic correlations of user profiles, the exemplar electronic document comprising at least a portion of the input, and at least respective portions of each of a plurality of stored subjects, the exemplar electronic document comprising a set of fields, fields in the set of fields being populated based on values from respective fields of stored subjects based on respective scores, each respective score being provided based on combining the respective semantic correlation of user profiles with the respective semantic comparison of subjects.

2. The method of claim 1, wherein processing the input in view of each of the stored subjects comprises semantically comparing features of the input to respective features of each of the stored subjects at least partially based on one or more hierarchical ontologies.

3. The method of claim 2, wherein semantically comparing comprises, for each input and stored subject pair, determining a semantic distance as a weighted average of a number of edges in the knowledge graph between features of the input and features of the stored subject.

4. The method of claim 1, wherein processing a user profile of the user in view of each of a plurality of other user profiles comprises semantically correlating attributes of the user profile to respective attributes of each of the plurality of other user profiles using graph subsumption.

5. The method of claim 1, wherein the exemplar electronic document is a travel itinerary.

6. The method of claim 5, further comprising:
   transmitting the exemplar electronic document to one or more computer-implemented booking services; and
   receiving a modified exemplar electronic document from the one or more computer-implemented services, the modified exemplar electronic document comprising booking data.

7. A non-transitory computer-readable storage medium coupled to one or more processors and having instructions stored thereon which, when executed by the one or more processors, cause the one or more processors to perform operations for providing an exemplar electronic document, the operations comprising:
   receiving input from a user, the input comprising data that is at least partially representative of a subject;
   receiving a plurality of stored subjects, each stored subject comprising data that is at least partially representative of the respective stored subject, and that is provided in a knowledge graph;
   processing the input in view of each of the stored subjects based on semantic comparison between the input and each of the stored subjects to provide a set of semantic comparisons of subjects, each semantic comparison of subjects representing the input and a respective stored subject;
   processing a user profile of the user in view of each of a plurality of other user profiles to provide a set of semantic correlations of user profiles, each semantic correlation of user profiles representing the user profile and a respective other user profile; and
   providing the exemplar electronic document based on the set of semantic comparisons of subjects and the set of semantic correlations of user profiles, the exemplar electronic document comprising at least a portion of the input, and at least respective portions of each of a plurality of stored subjects, the exemplar electronic document comprising a set of fields, fields in the set of fields being populated based on values from respective fields of stored subjects based on respective scores, each respective score being provided based on combining the respective semantic correlation of user profiles with the respective semantic comparison of subjects.

8. The non-transitory computer-readable storage medium of claim 7, wherein processing the input in view of each of the stored subjects comprises semantically comparing features of the input to respective features of each of the stored subjects at least partially based on one or more hierarchical ontologies.

9. The non-transitory computer-readable storage medium of claim 8, wherein semantically comparing comprises, for each input and stored subject pair, determining a semantic distance as a weighted average of a number of edges in the knowledge graph between features of the input and features of the stored subject.

10. The non-transitory computer-readable storage medium of claim 7, wherein processing a user profile of the user in view of each of a plurality of other user profiles comprises semantically correlating attributes of the user profile to respective attributes of each of the plurality of other user profiles using graph subsumption.

11. The non-transitory computer-readable storage medium of claim 7, wherein the exemplar electronic document is a travel itinerary.

12. The non-transitory computer-readable storage medium of claim 11, wherein operations further comprise:
    transmitting the exemplar electronic document to one or more computer-implemented booking services; and receiving a modified exemplar electronic document from the one or more computer-implemented services, the modified exemplar electronic document comprising booking data.

13. A system, comprising:

one or more hardware processors; and a non-transitory computer-readable storage device coupled to the one or more processors and having instructions stored thereon which, when executed by the one or more processors, cause the one or more processors to perform operations for providing an exemplar electronic document, the operations comprising:

receiving input from a user, the input comprising data that is at least partially representative of a subject;

receiving a plurality of stored subjects, each stored subject comprising data that is at least partially representative of the respective stored subject, and that is provided in a knowledge graph;

processing the input in view of each of the stored subjects based on semantic comparison between the input and each of the stored subjects to provide a set of semantic comparisons of subjects, each semantic comparison of subjects representing the input and a respective stored subject;

processing a user profile of the user in view of each of a plurality of other user profiles to provide a set of semantic correlations of user profiles, each semantic correlation of user profiles representing the user profile and a respective other user profile; and providing the exemplar electronic document based on the set of semantic comparisons of subjects and the set of semantic correlations of user profiles, the exemplar electronic document comprising at least a portion of the input, and at least respective portions of each of a plurality of stored subjects, the exemplar electronic document comprising a set of fields, fields in the set of fields being populated based on values from respective fields of stored subjects based on respective scores, each respective score being provided based on combining the respective semantic correlation of user profiles with the respective semantic comparison of subjects.

14. The system of claim 13, wherein processing the input in view of each of the stored subjects comprises semantically comparing features of the input to respective features of each of the stored subjects at least partially based on one or more hierarchical ontologies.

15. The system of claim 14, wherein semantically comparing comprises, for each input and stored subject pair, determining a semantic distance as a weighted average of a number of edges in the knowledge graph between features of the input and features of the stored subject.

16. The system of claim 13, wherein processing a user profile of the user in view of each of a plurality of other user profiles comprises semantically correlating attributes of the user profile to respective attributes of each of the plurality of other user profiles using graph subsumption.

17. The system of claim 13, wherein the exemplar electronic document is a travel itinerary.

* * * * *